United States Patent
Jong et al.

(10) Patent No.: US 8,364,207 B2
(45) Date of Patent: Jan. 29, 2013

(54) METHOD FOR DISPLAYING AN IDLE SCREEN IN A PORTABLE TERMINAL AND A PORTABLE TERMINAL EMPLOYING THE SAME

(75) Inventors: In Won Jong, Seoul (KR); Sung Hwan Baek, Suwon-si (KR); Jin Yong Kim, Suwon-si (KR); Hee Kyung Jeon, Seoul (KR); Nho Kyung Hong, Seoul (KR); Su Jung Youn, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 992 days.

(21) Appl. No.: 11/902,097

(22) Filed: Sep. 19, 2007

(65) Prior Publication Data

US 2008/0090619 A1 Apr. 17, 2008

(30) Foreign Application Priority Data

Oct. 11, 2006 (KR) .......................... 10-2006-0099065

(51) Int. Cl.
*H04M 1/00* (2006.01)

(52) U.S. Cl. ........................ 455/566; 455/550.1; 345/418

(58) Field of Classification Search .................. 455/566, 455/550.1; 345/418, 581, 619
See application file for complete search history.

(56) References Cited

U.S. PATENT DOCUMENTS

| | | | |
|---|---|---|---|
| 2002/0054158 A1* | 5/2002 | Asami | 345/838 |
| 2004/0075701 A1 | 4/2004 | Ng | |
| 2008/0033997 A1* | 2/2008 | Banker | 707/104.1 |

FOREIGN PATENT DOCUMENTS

| | | | |
|---|---|---|---|
| JP | 2005217947 A | * | 8/2005 |
| KR | 1020050082209 A | | 8/2005 |
| KR | 10-2006-0102764 | * | 9/2006 |
| KR | 1020060102764 A | | 9/2006 |
| WO | WO 96/16395 | * | 5/1996 |
| WO | WO 2005003954 A2 | * | 1/2005 |
| WO | 2005/039160 A1 | | 4/2005 |

* cited by examiner

*Primary Examiner* — George Eng
*Assistant Examiner* — Jing Gao
(74) *Attorney, Agent, or Firm* — Jefferson IP Law LLP

(57) ABSTRACT

A portable terminal and a method for displaying an idle screen of the portable terminal are provided. The terminal includes a Radio Frequency (RF) unit for receiving signal from an external, a memory for storing a plurality of image elements comprising an idle screen image (IDLE_Img), a key input unit for generating a key input signal, a display unit for displaying the IDLE_Img, a battery for supplying necessary power to a terminal, and a controller for controlling receiving/transmitting signals between the respective components comprising the RF unit, the memory, the key input unit, the display unit and the battery, and for controlling the IDLE_Img to be displayed differently from a preset image according to system internal information parameter (Sys_Info) generated in response to changes of the respective components.

10 Claims, 9 Drawing Sheets
(5 of 9 Drawing Sheet(s) Filed in Color)

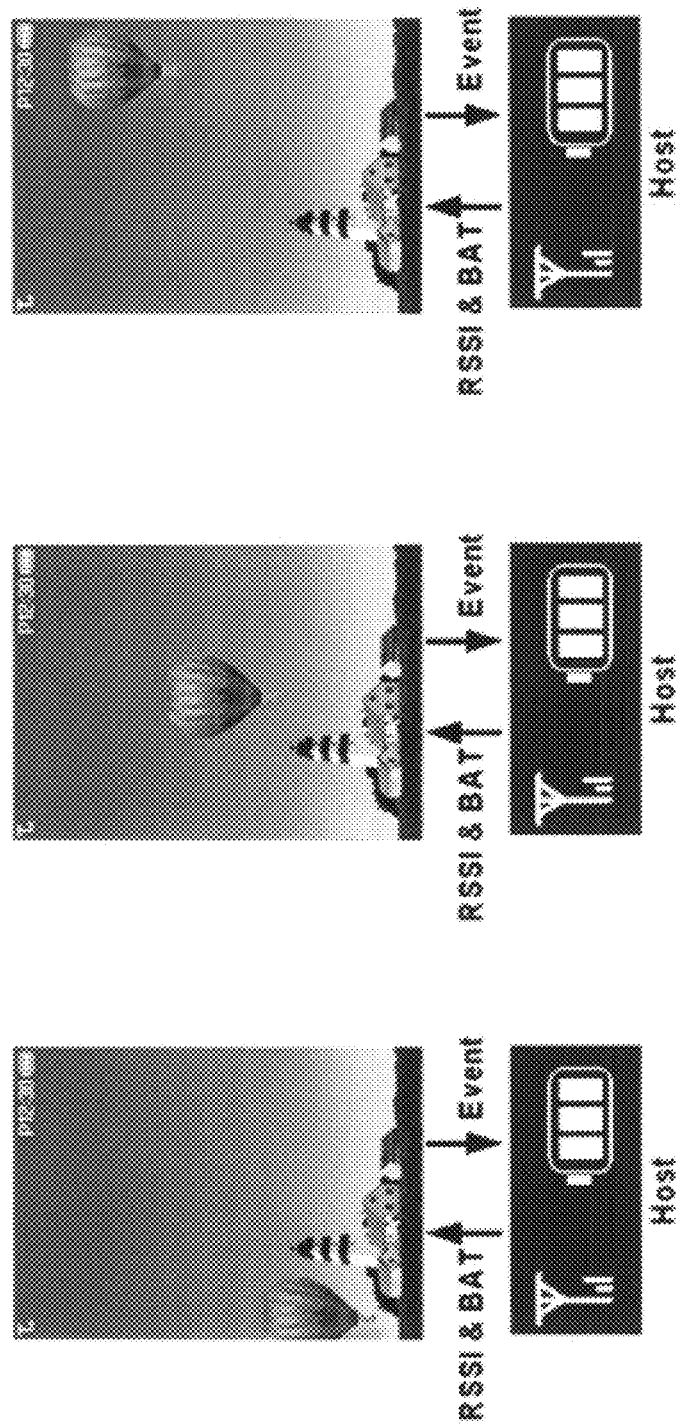

METHOD FOR DISPLAYING AN IDLE SCREEN IN A PORTABLE TERMINAL AND A PORTABLE TERMINAL EMPLOYING THE SAME

PRIORITY

This application claims the benefit under 35 U.S.C. §119(a) of a Korean patent application filed on Oct. 11, 2006 in the Korean Intellectual Property Office and assigned Serial No. 2006-0099065, the entire disclosure of which is hereby incorporated by reference.

BACKGROUND OF THE INVENTION

1. Field of the Invention

The present invention relates generally to a method for displaying an idle screen in a portable terminal and a portable terminal using the same. More particularly, the present invention relates to a portable terminal and a method for displaying an idle screen that changes according to a change of information relating to the portable terminal.

2. Description of the Prior Art

A portable terminal is diversely used in many fields due to its easy portability, capability of storing and displaying diverse application programs, and its functionality based on a high number of optional functions. Among portable terminals, a mobile communication terminal also has a function of a voice call during movement so that the number of users and service subscribers is rapidly increased.

The portable terminal generally includes a display unit for displaying information stored in the portable terminal, information received from an external source and the like. In order to control a basic function of the portable terminal, e.g., the inputting of a number for connecting a call, the displaying of a composition window for writing a text message and the like and allow the user to visually recognize diverse states of the portable terminal, the display unit can display a still image and a moving image.

For example, an idle screen is a window first displayed when opening the portable terminal. The idle screen is seen most often from among a plurality of images that can be activated in the display unit of the portable terminal and thus the user of the portable terminal most often encounters the idle screen. Accordingly, various items have been developed in order to expand the utility of the idle screen or attract the user's interest.

It would be of convenience to the user if the portable terminal included an appropriate image for displaying in the idle screen and a useful image to assist the user in considering the characteristics of the portable terminal such as a spatial limitation of the display unit of the terminal, a resolution of the appropriate image for processing a display image, a limitation of supportable hardware and the like, and should display a utility image to the user. Therefore, a method for displaying a useful idle screen which informs of a device characteristic of the portable terminal attracts the user's interest as well as provides specific information which is greatly required.

SUMMARY OF THE INVENTION

An aspect of the present invention is to address the above-mentioned problems and/or disadvantage and to provide at least the advantages described below. Accordingly, an aspect of the present invention is to provide a portable terminal and a method for displaying an idle screen of the portable terminal, which displays more visual information together with an individualized and differentiated idle screen thereby attracting the interest of a user of the portable terminal and providing the user with the useful information.

In accordance with an aspect of the present invention, a method for displaying an idle screen of the portable terminal is provided. The method includes collecting a plurality of system internal information parameters (Sys_Infos) generated according to a change of a system state of the portable terminal, applying the collected Sys_Info to an idle screen image (IDLE_Img) and generating an applied image different from a preset IDLE_Img, and transmitting the applied IDLE_Img to a display unit and displaying the applied IDLE_Img.

In accordance with another aspect of the present invention, a method for displaying an idle screen of a portable terminal is provided. The method includes collecting Sys_Info of the portable terminal according to at least one of state changes between received signal electrical field strength and internal remaining power, applying the change of the received signal electrical field strength and the internal remaining power to at least one image element forming an IDLE_Img, generating an IDLE_Img different from the previous IDLE_Img by using partially changed image elements among previous image elements, and displaying the generated IDLE_Img.

In accordance with still another aspect of the present invention, a portable terminal is provided. The terminal includes a Radio Frequency (RF) unit for receiving a signal from an external source, a memory for storing a plurality of image elements forming an IDLE_Img, a key input unit for generating a key input signal, a display unit for displaying the IDLE_Img, a battery for supplying necessary power to the portable terminal and a controller for controlling receiving/transmitting signals between respective components including the RF unit, the memory, the key input unit, the display unit and the battery and for controlling the IDLE_Img to be displayed differently from a preset image according to Sys_Info generated in response to changes of the respective components.

Particulars of exemplary embodiments are incorporated in the following description and attached drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of certain exemplary embodiments of the present invention will be more apparent from the following detailed description taken in conjunction with the accompanying drawings, in which:

FIGS. 5A and 5B are views illustrating a method for displaying an idle screen according to an exemplary embodiment of the present invention;

The same reference numerals are used to represent the same elements throughout the drawings.

DETAILED DESCRIPTION OF EXEMPLARY EMBODIMENTS

Figure 1:
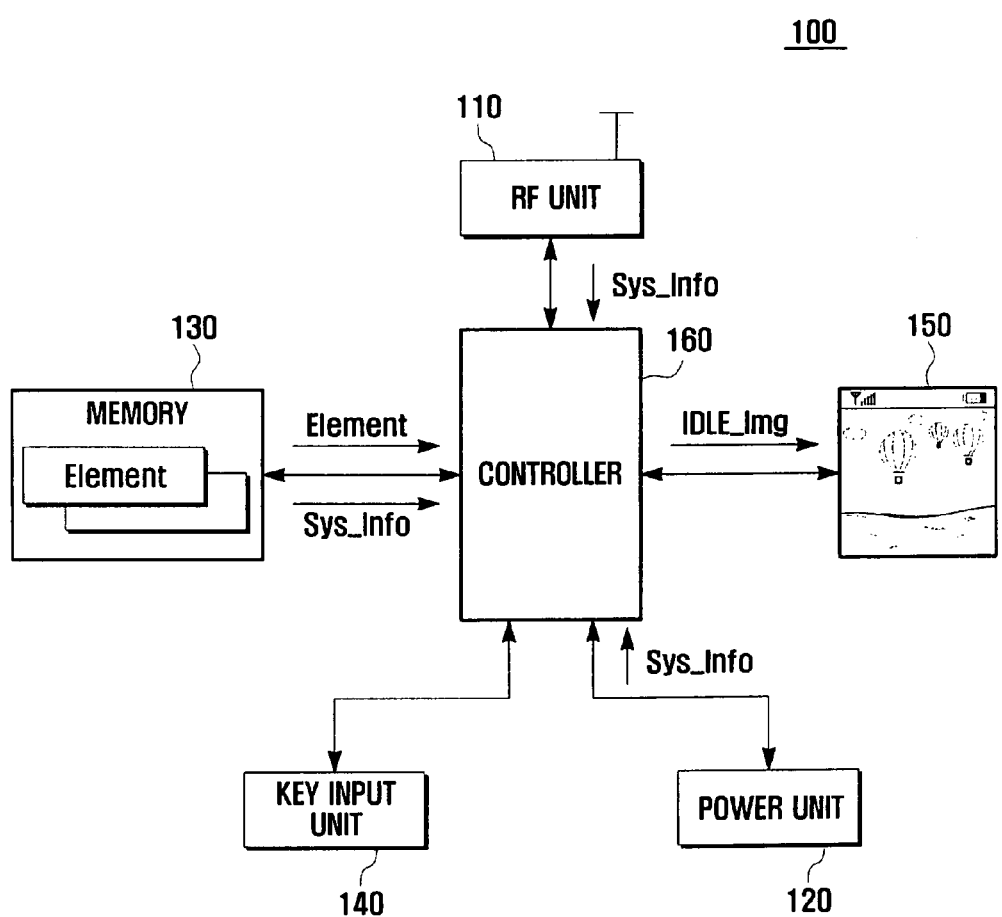
FIG. 1 is a diagram illustrating a construction of a portable terminal according to an exemplary embodiment of the present invention.

Hereinafter, exemplary embodiments of the present invention are described in detail with reference to the accompanying drawings. Detailed descriptions of constructions or processes known in the art may be omitted to avoid obscuring the invention in unnecessary detail.

Those skilled in the art can easily understand that terminologies used in the following description and the claims are not to be interpreted based on conventions or dictionaries, but based on the principle that the inventor can properly define terminologies in order to best define the invention. In addition, the construction described and shown in the specification and drawings corresponds only to an exemplary embodiment of the present invention, and does not include the entire technological idea of an exemplary embodiment of the present invention. Various changes or modifications of the embodiment are possible without departing from the scope of the invention.

For example, an image displayed in the display unit of the portable terminal will be described hereinafter as an exemplary embodiment related to a device and bicycle traveling. However, the method for displaying the idle screen of the portable terminal according to an exemplary embodiment of the present invention is not limited thereto. That is, the method for displaying the idle screen of the portable terminal according to an exemplary embodiment is not limited to a specific image displayed in the display unit, instead, the method can be applicable to any image which can be changeable according to internal information of the portable terminal. Also, the method can be variously applicable to an expanded and transformed shape of the image.

Further, for the precision of the principles of the invention and the convenience of description and understanding, the screen of the display unit of the portable terminal applied to an exemplary embodiment of the present invention is defined as a standby screen or a idle screen. However, the screen can be called by other names, e.g., a screen during a pause, an initial screen.

As used herein, the portable terminal for performing a function according to an exemplary embodiment of the present invention refers to a mobile communication terminal for convenience of description. However, the invention does not always have a meaning limited thereto. That is, the portable terminal according to an exemplary embodiment of the present invention may comprise a terminal capable of displaying an image in the idle screen corresponding to information generated by the terminal through its connection to a peripheral network and/or information related to a function of the terminal. Moreover, the invention may be applied to a device for information communications as well as multimedia devices, such as a mobile communication terminal, a digital broadcasting terminal, a Personal Digital Assistant (PDA), a smart phone, an International Mobile Telecommunication 2000 (IMT-2000) terminal, a Wideband Code Division Multiple Access (WCDMA) terminal and a Universal Mobile Telecommunication service (UMTS) terminal and the like and its applications.

Figure 2:
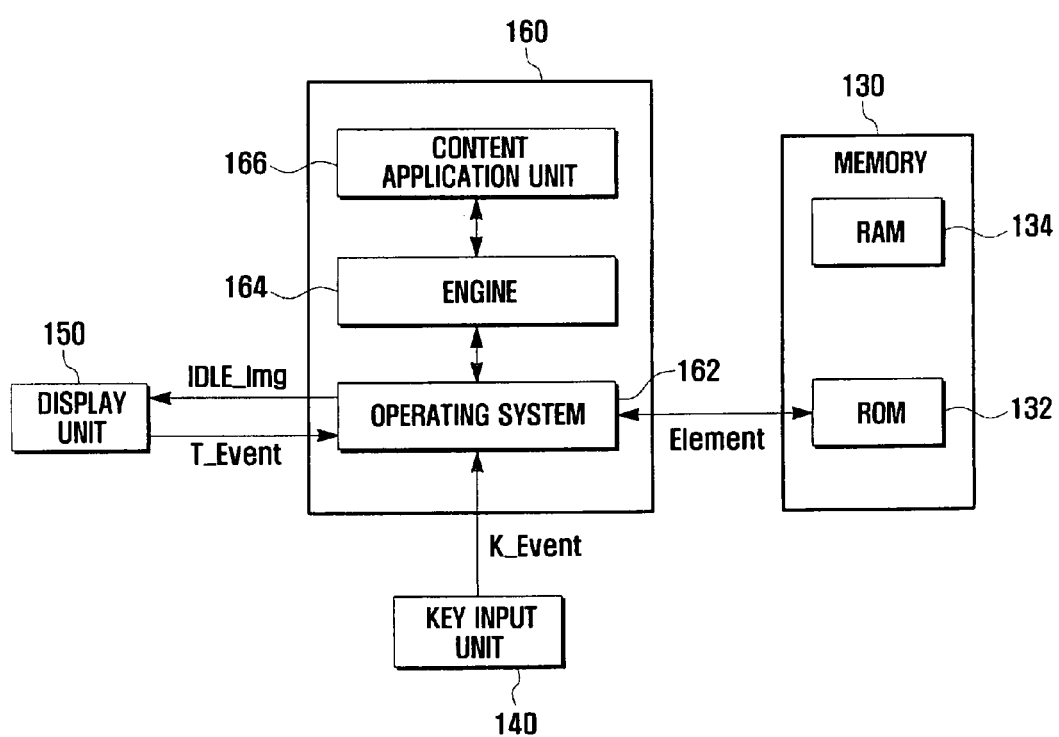
FIG. 2 is a diagram illustrating a construction of a controller according to an exemplary embodiment of the present invention.

FIG. 1 is a block diagram illustrating a construction for displaying an idle screen of a portable terminal according to an exemplary embodiment of the present invention, and FIG. 2 is a diagram illustrating construction of a controller and a memory according to an exemplary embodiment of the present invention.

Referring to FIGS. 1 and 2, a portable terminal 100 according to an exemplary embodiment of the present invention includes a Radio Frequency (RF) unit 110, a power unit 120, a memory 130, a key input unit 140, a display unit 150 and a controller 160.

The RF unit 110 may undertake a series of communications which may include forming a communication channel with a base station for a voice call, wirelessly transmitting user's data to another portable terminal and the like, or receiving/transmitting content through a linkage with an external web server and a control signal related with the content and the like. The RF unit 110 can include an RF transmitter for engaging in upward conversion and for amplifying a frequency of the transmitted signal and an RF receiver for low-noise amplifying the received signal and engaging in downward conversion of the frequency and the like.

The RF unit 110 can recognize a network state of the portable terminal 100. For example, the RF unit 110 can recognize the reception sensitivity of the terminal 100 based on the power of a signal transmitted from a base station and received at the terminal, wherein the received signal's electrical field strength within the RF unit 110 is used for an index of the reception sensitivity. The RF unit 110 provides a value based on the received signal's electrical field strength for displaying an antenna reception icon indicated on a certain side of the display unit 150. The RF unit also provides the controller 160 with the value of the received signal's electrical field strength as a system internal information parameter (Sys_Info) for changing an idle screen image (IDLE_Img).

The power unit 120 is a device for supplying the power necessary for driving the respective functions of the terminal 100. The power unit 120 can be provided with an external power unit removable from a side of a case of the portable terminal 100, an internal power unit fixed inside of the portable terminal 100 and the like. Further, in an exemplary implementation, the power unit 120 uses a rechargeable battery in consideration of protecting the environment and cost efficiency. The rechargeable battery may comprise a nickel battery, a nickel-cadmium battery, a hydrogen battery, a lithium cell, a secondary cell, a chemical cell and the like. The remaining power stored in the power unit 120 can be determined by the controller 160 by scanning the power unit 120. The remaining power may be represented by an icon indicating the remaining power shown on a side of the display unit 150. Also, like the received signal's electrical field strength, the remaining power can be used as the Sys_Info for changing an idle screen image (IDLE_Img) as well.

The memory 130 stores an image element (Element), forms the IDLE_Img according to a control of the controller 160 in activating the idle screen and transmits it to the display unit 150. The memory 130 includes a program region and a data region.

The program region stores an operating system for booting the portable terminal 100, an application program necessary for playing multimedia content and the like, and an application program necessary for other optional functions of the portable terminal 100 such as a function of a camera, sound play, image or moving picture play and the like. When the respective functions are activated in response to a request of the user, the portable terminal 100 provides the respective functions by using the corresponding application programs under the control of the controller 160.

The data region is a region for storing the data generated by using the portable terminal 100, and can store a photographed image or moving picture taken by the camera function, phone book data, audio data, corresponding content or information corresponding to user's data and the like. In an exemplary embodiment, the data region stores the Element which forms independently and individually the IDLE_Img displayed on the idle screen. The controller 160 transmits the IDLE_Img formed with the Element to the display unit 150 in response to a change of the Sys_Info under the control of the controller 160.

Further, the memory 130 according to an exemplary embodiment of the present invention can determine the remaining or unused size of the memory 130 by scanning of the controller 160. At this time, the controller 160 may use the remaining size of the memory 130 as the Sys_Info necessary for changing the IDLE_Img.

In contrast, the IDLE_Img stored in the memory 130 may be formed with respective individual and hierarchical Elements. For example, when the IDLE_Img is formed with respective moving pictures in which the sun is in the autumn sky, migratory birds fly, the background is the sea, clouds are in the sky and an excursion boat is on the sea, the respective Elements of the sky, the sun, the migratory birds, the sea, the clouds and the excursion boat are independently indicated so that the respective Elements generate one IDLE_Img. Furthermore, when the image is changed according to time spent in the IDLE_Img, e.g., movement of the birds, waves of the sea, the flow of clouds and movement of the excursion boat and the like, the independent change of the respective Elements is indicated in such a manner that the moving picture in the IDLE_Img is displayed.

The memory 130 includes a Read Only Memory (ROM) 132 for storing the Elements forming the IDLE_Img and a Random Access Memory (RAM) 134 for storing the Element in order to activate the respective Elements stored in the ROM 132. The ROM 132 and the RAM 134 can be provided with a flash memory. However, the memory 130 according to an exemplary embodiment of the present invention is not limited to a flash memory. That is, the ROM 132 may be formed with a non-volatile memory such as the ROM, a Programmable ROM (PROM), an Erasable PROM (EPROM), an Electrically EPROM (EEPROM) and the Flash ROM and the like, and the RAM 134 may be formed with a volatile memory such as a Static Random Access Memory (SRAM), a Dynamic RAM (DRAM), a Synchronous DRAM (SDRAM), and a Ferro-Electric Dynamic Random Access Memory (FDRAM) and the like. Further the RAM 134 can be formed with the flash memory of the non-volatile memory.

The key input unit 140 is provided with alphanumeric keys for inputting characters or numbers and function keys for setting various functions. The function keys may include direction keys, side keys, short cut keys and the like to be set for performing a specific function. Further, the key input unit 140 supplies the key signal input relating to the user's setting and the function control of the portable terminal 100 to the controller 160.

In an exemplary embodiment, the key input unit 140 inputs a signal for changing the IDLE_Img. That is, in order to move a specific image displayed in an idle screen toward a desired direction in the screen and move it according to a specific pattern, the key input unit 140 inputs signals for an input of a beginning point of the specific image, for input of a traffic line of the pattern, and for an input of an ending point of the movement line of the image. When the key input unit 140 is provided with a touch panel on the display unit 150, the input signal set for movement of the specific image can be more easily input. A key input signal (K_Event) input by the key input unit 140 and a touch event (T_Event) input by the touch panel can be used for the Sys_Info.

The display unit 150 displays various items of a menu of the portable terminal 100 as well as information input from the user or information provided to the user. The display unit 150 may be provided with a Liquid Crystal Display (LCD). When the LCD includes a touch screen, the display unit 150 can be included as an input means such as a key input means.

The display unit 150 according to an exemplary embodiment of the present invention displays an IDLE_Img having images changed differently according to the change of the Sys_Info generated from at least one of the RF unit 110, the power unit 120 and the memory 130. That is, any one of the Element forming the IDLE_Img stored in the memory 130 is matched with a Sys_Info according to the K_Event of the key input unit 140, a Sys_Info according to the received signal electrical field strength of the RF unit 110, a Sys_Info according to the remaining power and a Sys_Info according to the remaining size of the memory 130 respectively or combinationally, so that the Elements are changed according to the change of the corresponding Sys_Info. Accordingly, the IDLE_Img displayed in the display unit 150 is not displayed with the moving picture having a fixed location but is displayed as a flexible moving picture according to changes of the Sys_Info.

The controller 160 controls the general operations of the portable terminal 100 and the signal flow between the internal blocks of the portable terminal 100.

In an exemplary embodiment, the controller 160 controls the function related with the control of the IDLE_Img display in response to a change of the Sys_Info. In more detail, the controller 160 relates the Element forming the IDLE_Img with the Sys_Info and displays the Element differently so that it changes the general IDLE_Img. Here, it is possible that one of the Sys_Info can correspond to not only one Element but also at least two Elements. That is, the controller 160 can control the change of a plurality of the Elements according to the change of one Sys_Info, and the change of the plurality of the Sys_Infos can be applied to one Element in a combinational manner.

To this end, the controller 160, as shown in FIG. 2, includes an operating system 162 for collecting the Sys_Infos of the portable terminal 100 and for controlling the display of the IDLE_Img, a content application unit 166 for making a request for elements to the operating system 162 and for storing the requested Element as values relating to the Sys_Info in the memory 130, and an engine 164 disposed between the content application unit 166 and the operating system 162 for transmitting the Element therebetween.

The operating system 162 collects the Sys_Info corresponding to the K_Event input by the key input unit 140, the Sys_Info corresponding to the received signal electrical field strength determined by the RF unit 110, the Sys_Info corresponding to the remaining power of the power unit 120 and the Sys_Info corresponding to the remaining size of the memory 130 and the like and transmits the collected respective Sys_Info to the content application unit 166 through the engine 164. Further, the operating system 162 transmits the Elements stored in the memory 130 to the content application unit 166 according to a request of the content application unit 166. And, if the content application unit 166 stores the values relating to the Sys_Info for the Elements in the memory 130, the operating system 162 forms the IDLE_Img by using the Element and the values of the Sys_Info stored in the memory 130 and transmits the formed IDLE_Img to the display unit 150, thereby displaying the IDLE_Img.

The content application unit 166 relates the Element loaded from the memory 130 with the values of the Sys_Info for changing the Element and stores the values in the memory 130. When the related Element is displayed in the display unit 150, the Element is applied to the value of the Sys_Info so that an IDLE_Img different from the previous IDLE_Img is displayed.

For an example of the operation of the content application unit 166, it is assumed that there is a sail boat element in the Element forming the previous IDLE_Img, and the sail boat basically moves from the left to the right or in a predetermined route in the idle screen of the display unit 150. At this time, the content application unit 166 controls the movement direction or a shape of a sail of the sail boat element to be differently displayed according to the change of the Sys_Info corresponding to the received signal electrical field strength or the Sys_Info according to the remaining power among the Sys_Infos. To describe in more detail, as for the element values related to the sail and movement of the sailing boat element, the content application unit 166 can change coordinate values applied in order to display the movement and the sail shape of the sail boat in relation to the Sys_Info. As a result, the content application unit 166 can express the movement of the sail boat and change in the shape of the sail of the sailing boat. Further, the content application unit 166 matches the change of the value of the Sys_Info to the respective Elements having a different movement direction of the sail boat element or the different shape of the sail so that it can change the Element depending on the Sys_Info.

In the meantime, when the user of the terminal arbitrarily changes the IDLE_Img, the content application unit 166 can apply the changed value to the IDLE_Img. In detail, the IDLE_Img includes the Elements, and those Elements can move according to a preset coordinate value or a value generated from a random generator included inside of the terminal. The content application unit 166 can cause the Elements to move according to the designation of the user of the terminal, and can relate the movement line designated by the user of the terminal with the described Sys_Info. For example, in the IDLE_Img, a movement line and shape change of a specific Element depending on the Sys_Info can be changed according to the K_Event input from the user. As an example, when the reception sensitivity is decreased and the key input signal of the user indicates a move from the left to the right, the content application unit 166 can apply a corresponding change to the decrease of the reception sensitivity.

The engine 164 supports the respective data to be smoothly transmitted by involving steps in which the operating system 162 transmits the Element stored in the memory 130 to the content application unit 166 and the Element and the Sys_Info to the operating system.

FIGS. 1 and 2 illustrate a construction for describing an operation according to an exemplary embodiment of the present invention. That is, it is a matter of course that the portable terminal 100 of an exemplary embodiment of the present invention can further include a camera unit and/or a digital broadcasting module and the like according to a form of the provision.

Until now, the construction for displaying the idle screen of the portable terminal has been described according to an exemplary embodiment of the present invention. Hereinafter, the method for displaying an idle screen of the portable terminal according to an exemplary embodiment of the present invention will be described with reference to FIG. 3.

Figure 3:
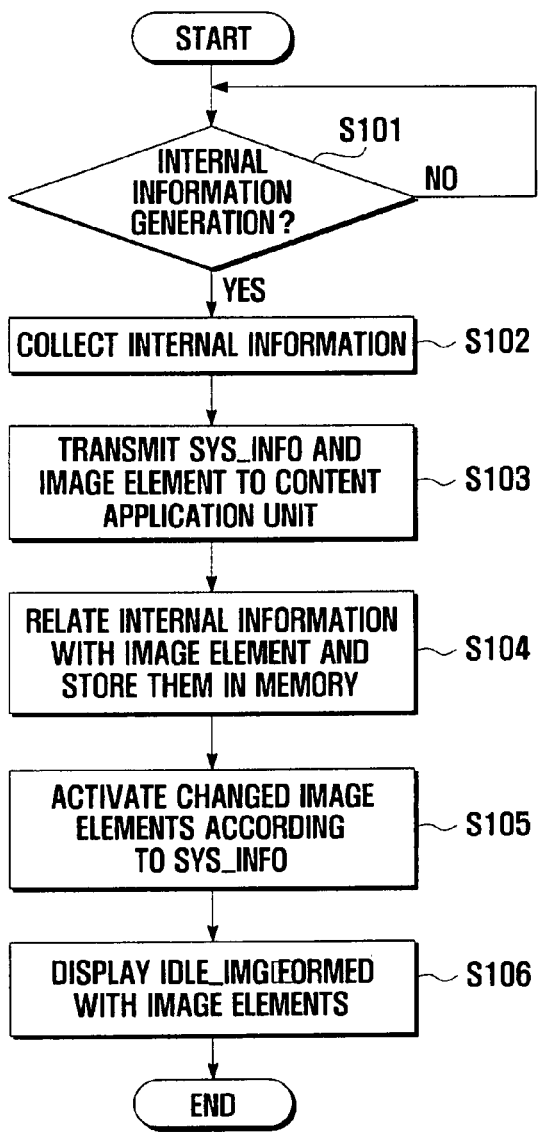
FIG. 3 is a flowchart illustrating a method for displaying an idle screen of a portable terminal according to an exemplary embodiment of the present invention.

FIG. 3 is a flowchart illustrating a method for displaying an idle screen of a portable terminal according to an exemplary embodiment of the present invention.

Referring to FIG. 3, in a method for displaying the idle screen of an exemplary embodiment of the present invention, the operating system 162 determines if internal information of the portable terminal 100 is generated in step S101.

In step S101, the operating system 162 identifies the respective internal information generated from at least one of the RF unit 110, the power unit 120 and the memory 130 during monitoring of the region in which the internal information occurs, e.g., the RF unit 110, the power unit 120 and the memory 130. For example, when the received signal's electrical field strength previously measured by the RF unit 110 is different from the currently measured received signal's electrical field strength, the controller 160 determines the change as the internal information. Likewise, the controller 160 determines the respective changes that occur when the remaining power is changed and the remaining size of the memory is changed as an occurrence of the internal information.

Next, the operating system 162 collects the internal information in step S102.

As an example of step S102, the operating system 162 may collect the value of the change of the received signal's electrical field strength generated from the RF unit 110, the value of the change of the remaining power generated from the power unit 120, the value of the change of the remaining size of the memory generated from the memory 130, a plurality of the K_Events generated from the key input unit 140 and the like as the respective Sys_Info.

Next, the operating system 162 transmits the Element requested by the content application unit 166 together with the Sys_Info to the content application unit 166 in step S103.

The content application unit 166 relates the Element with the Sys_Info, and then stores the related values in the specific region of the memory 130, e.g., in the RAM 134 in step S104.

In step S104, when the content application unit 166 stores the Element and the Sys_Info in the RAM 134, the content application unit 166 can store the entire data. However, in an exemplary implementation, the content application unit 166 stores the related list between the respective Elements and the Sys_Info, i.e., index values considering the efficiency of the data transmission and the system efficiency. In detail, the content application unit 166 applies the Sys_Info by matching the collected Sys_Info to a preset image element, respectively. For example, the content application unit 166 matches the change of the received signal's electrical field strength to any one of the various image elements forming the IDLE_Img and applies the Sys_Info to the matched image element according to the change of the received signal's electrical field strength. Here, the content application unit 166 can match one or more Sys_Infos to each image element independently, apply the plurality of Sys_Infos to one image element and apply the plurality of Sys_Infos to the plurality of image elements in a combinational manner.

Next, the operating system 162 identifies the Element stored in the memory 130 and the Sys_Info or the corresponding index values, and activates the IDLE_Img applied to the image element and the Sys_Info in step S105.

In step S105, the operating system 162 activates the respective image element independently in order to embody the entire IDLE_Img. The activation for the image element unit is a scheme of activating the respective sub images forming one image as aforementioned, in which the change of the entire IDLE_Img is activated and displayed by applying the Sys_Info to the respective image element units. At this time, a part of the entire image elements forming the IDLE_Img is not applied the Sys_Info but forms the IDLE_Img according to the predetermined state.

Next, the operating system 162 transmits the IDLE_Img to the display unit 150 in step S106.

In step S106, the operating system 162 displays every image element which is related and is not related with the image element applied to the Sys_Info among the entire IDLE_Img to the display unit 150 so that it generates an IDLE_Img. The generated IDLE_Img is the IDLE_Img different from the previous IDLE_Img due to display of the Elements applied to the Sys_Info. At this time, it is possible to duplicately indicate the previously indicated received sensitivity antenna and a bar for displaying the remaining power and the like in the Element.

Figure 4:
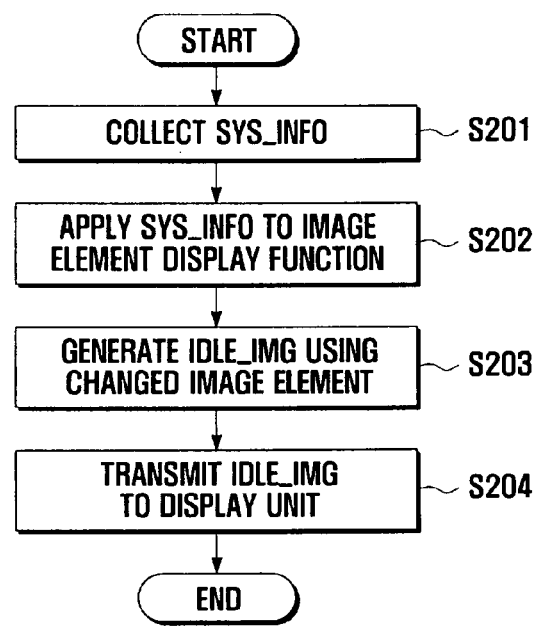
FIG. 4 is a flowchart illustrating a method for displaying an idle screen of a portable terminal based on a received signal electrical field strength and remaining power according to an exemplary embodiment of the present invention.

FIG. 4 is a flowchart illustrating a method for displaying an idle screen applied to an exemplary embodiment of the present invention.

Referring to FIG. 4, in a method for displaying the idle screen of an exemplary embodiment of the present invention, first, the controller 160 collects the Sys_Info generated according to the state change of the portable terminal in step S201.

The Sys_Info can be the received signal's electrical field strength of the portable terminal, the remaining power used for the power source of the portable terminal and the like.

Next, the controller 160 applies the received Sys_Info to an Element application function provided from the controller 160 in step S202.

In step S202, for an example of a function, in a case where the movement line of a balloon changes in the Elements, when z denotes an altitude of the balloon, x denotes received signal electrical field strength, and y denotes the remaining power, the function z can be defined by z=f(x,y), wherein f(x,y) refers to a function for changing the altitude of the balloon z according to parameters x and y.

Next, the controller 160 uses the Element changed according to the change of the input Sys_Info and forms the IDLE_Img and displays the IDLE_Img to the display unit 150 in step S204.

In the meantime, as another example of forming the IDLE_Img based on a change of the image element according to the received signal electrical field strength and the remaining power, the IDLE_Img can be formed by comparing the respective received signal electrical field strength and the remaining power with a specific reference value and combining the preset various image elements according to the difference between the compared value and the reference value.

As described in the above, in the method for displaying the idle screen of an exemplary embodiment of the present invention, the IDLE_Img can be changed according to the change of the internal information. Hereinafter, an example of the screen composition applied to the method for displaying the idle screen will be described in detail with reference to FIGS. 5A to 7.

Figure 5B:
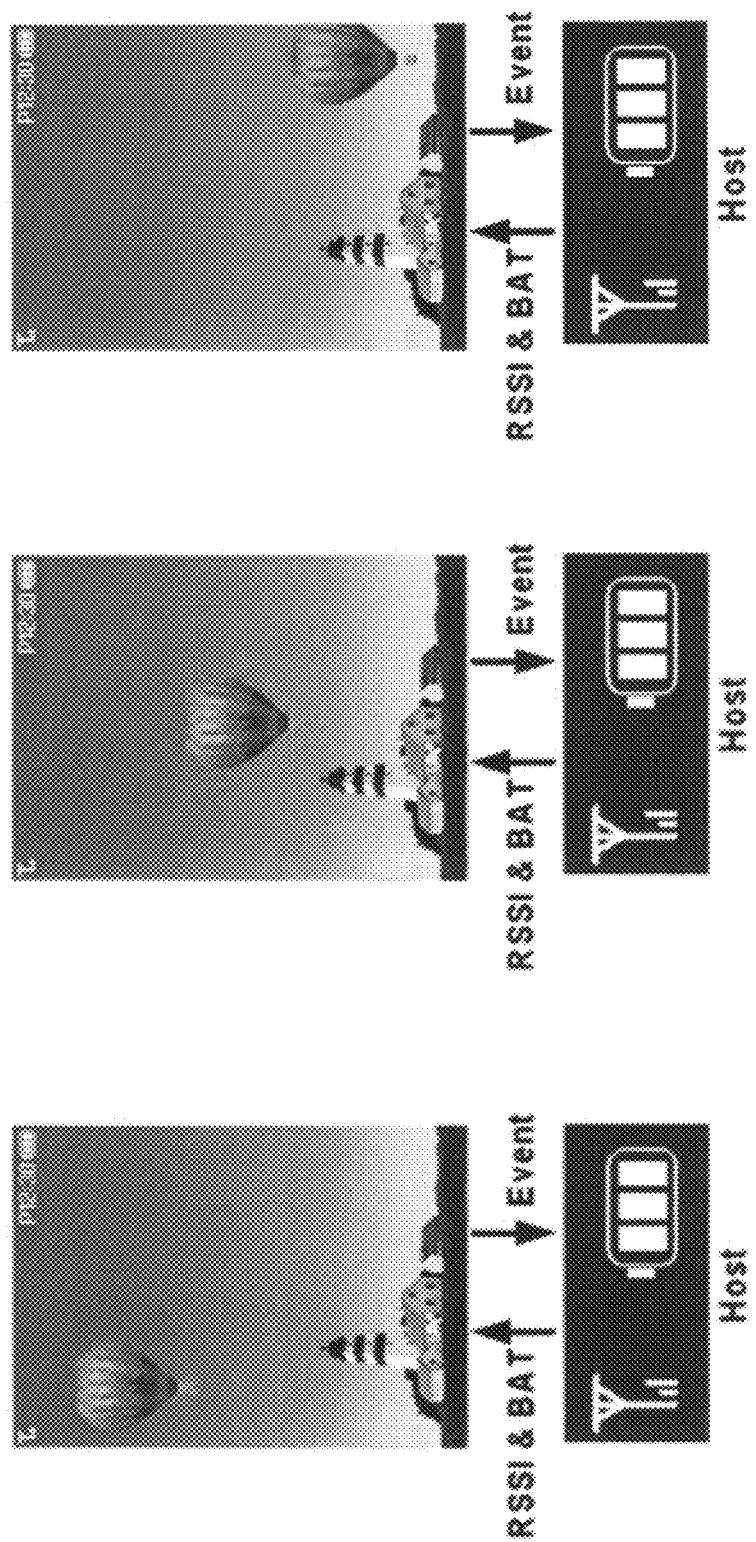

FIGS. 5A and 5B are diagrams of the screen illustrating that the Sys_Info is applied to the movement line and the height of the image element among the examples of the method for displaying the idle screen of an exemplary embodiment of the present invention.

FIG. 5A is a view of the screen in which the Sys_Info according to the received signal electrical field strength and remaining power among the Sys_Info is applied to the image element. In detail, in FIG. 5A, the received signal electrical field strength among the Sys_Infos is low, the battery is full charged, and the image element matched with the Sys_Info is a balloon. In FIG. 5A, the balloon moves according to the diagonal movement line from the lower left corner to the upper right corner. At this time, the quantity of the definition of the balloon is clear or vague in the lower left corner and becomes vague or clear as it goes toward the upper right corner, or it is possible to display the idle screen with their combinations. And, the "sky" and the "house" image elements allocated as a background of the screen diagram are not matched to the Sys_Infos related with the received signal's electrical field strength and the remaining power so that they are displayed as the predetermined values regardless of the change of the received signal electrical field strength and the remaining power.

FIG. 5B is a view of the screen displaying the image elements applied to the Sys_Info different from that of the FIG. 5A. In detail, in FIG. 5B, the received signal electrical field strength among the Sys_Infos is high, the remaining power is small and the image element matched to the Sys_Info is the balloon identical with that of the FIG. 5A. In FIG. 5B, the balloon moves according to a diagonal movement line from the upper left corner to the lower right corner, at this time, the quantity of the definition of the balloon is clear or vague in the upper left corner and becomes vague or clear in the lower right corner, and the change of the definition may be differently displayed according to the predetermined state. And, the "sky" and the "house" image elements allocated as a background of the screen diagram are not matched to the Sys_Infos related with the received signal's electrical field strength and the remaining power so that they are displayed as the predetermined value regardless of the change of the received signal electrical field strength and the remaining power.

In the "balloon" image element shown in FIGS. 5A and 5B, the quantity of the definition and the height and the direction of the movement line of the balloon and the like can be changed according to the setting change.

Figure 6A:
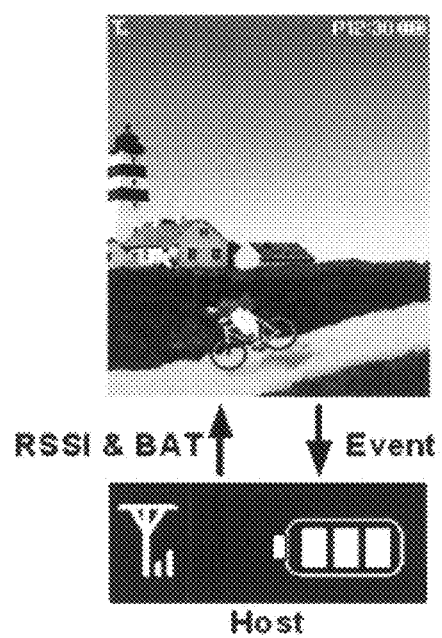
FIGS. 6A and 6B are views illustrating a method for displaying an idle screen according to an exemplary embodiment of the present invention.
Figure 6B:
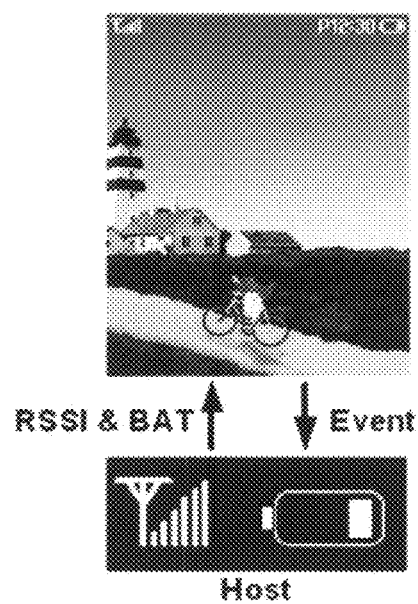

FIGS. 6A and 6B are the diagrams of a screen in which the Sys_Info is applied to a plurality of image elements according to a method for displaying the idle screen of an exemplary embodiment of the present invention.

Referring to FIG. 6A, the received signal's electrical field strength among the Sys_Infos is low, the battery is fully charged, and the image elements matched with the Sys_Info includes a "street" and a "bicycle". In the screen diagram, the street has a slope of downward from the right side to the left side, and the width of the street is quite wide. The bicycle is traveling from the right to the left on the street and the bicycle inclines and travels according to the change of the slope of the street.

The "sky" and the "house" image elements allocated as a background of the screen diagram are not matched to the Sys_Infos related with the received signal's electrical field strength and the remaining power so that they are displayed as the predetermined value regardless of the change of the received signal electrical field strength and the remaining power.

Referring to FIG. 6B, the received signal electrical field strength among the Sys_Infos is high as compared to that illustrated in FIG. 6A, the remaining power is small and the image elements matched to the Sys_Info are the "street" and the "bicycle" similar with those of FIG. 6A. In the screen, the street has a slope which is upward from the right to the left, and the width of the street is quite narrow. The bicycle is traveling from the right to the left on the street and is correspondingly inclined according to the slope of the street. That is the front wheel of the bicycle becomes higher than the rear wheel thereof according to change in the slope of the street with reference to the horizontal line.

And, the "sky" and the "house" image elements allocated as a background of the screen diagram are not matched to the Sys_Info related with the received signal's electrical field strength and the remaining power so that they are displayed as predetermined values regardless of the change of the received signal's electrical field strength and the remaining power.

The screen diagrams shown in FIGS. 6A and 6B illustrate examples in which the Sys_Infos corresponds to the received signal's electrical field strength and the remaining power in relation to the "street" and "bicycle" image elements.

Figure 7:
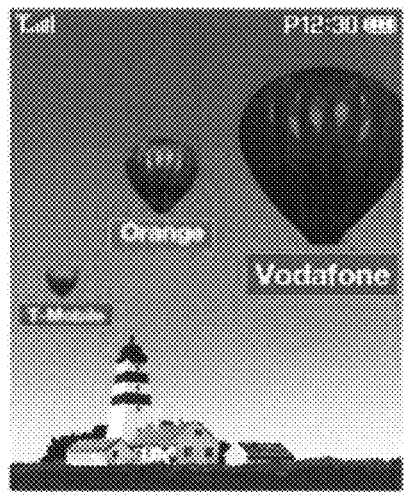
FIG. 7 is a view illustrating a method for displaying an idle screen according to an exemplary embodiment of the present invention.

FIG. 7 is a diagram of a screen in which the Sys_Info is applied to the movement line and the height of a plurality of image elements for displaying an idle screen of an exemplary embodiment of the present invention.

Prior to describing FIG. 7, it will be explained that the portable terminal illustrated in FIG. 7 is provided with a roaming SIM card. When a plurality of mobile communication network venders are available to provide a portable terminal with service, the portable terminal receives electrical power signals transmitted by the plurality of the network venders and displays the received signal electrical field strength, respectively. Referring to FIG. 7, the portable terminal can receive the signals from the mobile communication network venders, e.g., a Vodafone, an Orange and a T-Mobile, and display the received signal electrical field strength of the respective received signals. Further, at least one of the size, location and color of the "balloon" image elements shown in FIG. 7 can be differently displayed according to the received signals' electrical field strength.

Referring to FIG. 7, the respective balloons correspond to the mobile communication network venders, and each vendor can be indicated with the name of the providing vender on the lower side of the respective balloon. In FIG. 7, it is assumed that the signal provided from the Vodafone is in the best state, with the signals provided by the Orange and T-Mobile following. The image element matched to the received signal's electrical field strength is the "balloon", and the background image elements are the "sky" and the "house". In the screen, the balloon corresponding to the Vodafone, which has the best received signal's electrical field strength, has the biggest size and is displayed most clearly. Next, the balloon of the Orange has an appropriate size and definition and the balloon of the T-Mobile has the smallest size and is displayed vaguely. The definition of the balloon can be changed according to the preset state. Here, the image elements of the "sky" and "house" are not matched to the described received signal electrical field strength so that there are no changes according to the change of the received signal electrical field strength. In the method for displaying the screen, when the display unit 150 is provided with the touch screen, the user selects the vender having a better network state through selecting the balloon of the Vodafone by touch of the touch screen so that the user can enjoy the mobile communication service. Here, it may be possible that the display unit 150 designates and employs the screen using the keypad and the like rather than it is provided with the touch screen.

As described above, in the FIG. 7, the venders for providing the various network services can be set according to a choice of the user of the portable terminal, and it can notify the user of the comparison and difference between the Sys_Infos by contrasting the plurality of the Sys_Infos to the similar image element.

In the meantime, the exemplary embodiment of the screen according to an exemplary embodiment of the present invention is not limited to FIGS. 5A to 7. For example, it is possible to form the screen in which the Sys_Info is applied to the respective or a plurality of image elements in an independent or a combinational manner.

The portable terminal and the method for displaying the idle screen of the portable terminal according to an exemplary embodiment of the present invention displays the individualized and differentiated idle screen together with more visual information thereby allowing stimulation of an interest of the user of the portable terminal and to inform the user of useful information.

Although exemplary embodiments of the present invention have been described for illustrative purposes, those skilled in the art will appreciate that various modifications, additions and substitutions are possible, without departing from the scope and spirit of the invention as disclosed in the accompanying claims and their equivalents. Therefore, the embodiments described above should be understood as illustrative not restrictive in all aspects. The present invention is defined only by the scope of the appended claims and must be construed as including the meaning and scope of the claims, and all changes and modifications derived from equivalent concepts of the claims.

What is claimed is:

1. A method for displaying an idle screen of a portable terminal by using an idle screen image (IDLE_Img) including one or more image elements, the method comprising:
    collecting a plurality of system internal information parameters (Sys_Info) generated according to a change of a system state of the portable terminal;
    setting a movement line and a height on a display unit of at least one image elements of the one or more image elements based on a signal generated by an input unit;
    applying the collected plurality of Sys_Info to the at least one image element in the IDLE_Img and generating an applied IDLE_Img different from a preset IDLE_Img; and
    displaying the applied IDLE_Img on a display unit; wherein
    applying the collected plurality of Sys_Info to the at least one image element in the IDLE_Img comprises changing a position of the at least one image elements in the applied IDLE_Img to be in accordance with the movement line and the height and to reflect the plurality of Sys_Info.

2. The method of claim 1, wherein the Sys_Info comprises at least one of a change of received signal electrical field strength, a change of remaining power, a change of remaining size of a memory and a change of key input.

3. The method of claim 1, wherein the IDLE_Img comprises one image, which is constructed by independently overlapping the individual at least one image elements of the IDLE_Img on each other.

4. The method of claim 3, wherein the applying of the collected plurality of Sys_Info comprises changing at least one of a color, a size and a location of an image element to which the Sys_Info is applied.

5. The method of claim 3, wherein the Sys_Info comprises a plurality of received signal electrical field strengths received from an external source.

6. The method of claim 5, wherein the IDLE_Img comprises an image element allocated to the respective received signal electrical field strengths, and at least one of a size, a location and a color of the respective image elements is differently displayed according to a characteristic of the plurality of the received signal electrical field strengths.

7. A portable terminal comprising:
a Radio Frequency (RF) unit for receiving a signal from an external source;
a memory for storing a plurality of image elements forming an idle screen image (IDLE_Img);
a display unit for displaying the IDLE_Img;
a key input unit for generating a key input signal and for setting a movement line and a height on the display unit of at least one of the plurality of image elements;
a battery for supplying necessary power to the portable terminal; and
a controller for controlling signals between respective components comprising the RF unit, the memory, the key input unit, the display unit and the battery, for controlling the IDLE Img to be displayed differently from a preset image by applying a plurality of system internal information parameters (Sys_Info) generated in response to changes of the respective components to the at least one image elements, and for changing a position of the at least one of the plurality of image elements to be in accordance with the movement line and the height and to reflect the plurality of Sys_Info.

8. The portable terminal of claim 7, wherein the Sys Info comprises at least one of a change of received signal electrical field strength, a change of remaining power, a change of remaining size of the memory and a change of the key input.

9. The portable terminal of claim 7, wherein the controller comprises:
a content application unit for designating a changed value of the image elements changed depending on the Sys_Info;
an operating system for collecting the Sys_Info and controlling the IDLE_Img to be displayed based on the image elements designated by the content application unit; and
an engine for transmitting a signal between the operating system and the content application unit.

10. The portable terminal of claim 7, wherein the IDLE_Img comprises one image, which is independently overlapping, and the plurality of Sys_Info are applied to the at least one of the plurality of image elements so that a setting comprising at least one of a color, a size and a location of the at least one image element is changed.

* * * * *